United States Patent
Kawakami (10) Patent No.: US 10,883,441 B2
(45) Date of Patent: Jan. 5, 2021

(54) CONTROL SYSTEM FOR DIESEL ENGINE

(71) Applicant: TOYOTA JIDOSHA KABUSHIKI KAISHA, Toyota (JP)

(72) Inventor: Jun Kawakami, Susono (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 16 days.

(21) Appl. No.: 16/384,323

(22) Filed: Apr. 15, 2019

(65) Prior Publication Data

US 2019/0383228 A1  Dec. 19, 2019

(30) Foreign Application Priority Data

Jun. 14, 2018 (JP) .................. 2018-113829

(51) Int. Cl.
| | | |
|---|---|---|
| F02D 41/38 | (2006.01) | |
| F02B 23/06 | (2006.01) | |
| F02D 41/30 | (2006.01) | |
| F02D 41/40 | (2006.01) | |
| F02M 61/16 | (2006.01) | |

(52) U.S. Cl.
CPC ...... *F02D 41/3827* (2013.01); *F02B 23/0603* (2013.01); *F02D 41/3005* (2013.01); *F02D 41/3836* (2013.01); *F02D 41/401* (2013.01); *F02M 61/162* (2013.01)

(58) Field of Classification Search
CPC .......... F02B 23/0603; F02D 2041/389; F02D 2200/021; F02D 2200/0602; F02D 2200/703; F02D 35/023; F02D 41/3005; F02D 41/3827; F02D 41/3836; F02D 41/40; F02D 41/401; F02M 61/162
See application file for complete search history.

(56) References Cited

U.S. PATENT DOCUMENTS

| | | | | |
|---|---|---|---|---|
| RE30,426 | E  * | 11/1980 | Haslett ................ | F02B 23/0603 123/143 B |
| 4,550,707 | A  * | 11/1985 | Kervagoret ............... | F02B 3/08 123/193.6 |
| 4,920,942 | A  * | 5/1990 | Fujimori ................ | F02M 69/02 123/497 |

(Continued)

FOREIGN PATENT DOCUMENTS

| | | | | |
|---|---|---|---|---|
| JP | 05005415 | A  * | 1/1993 | .......... F02B 23/0651 |
| JP | H06-017651 | A | 1/1994 | |

(Continued)

*Primary Examiner* — Carl C Staubach
(74) *Attorney, Agent, or Firm* — Oliff PLC (57) ABSTRACT

The fuel injection timing IT is changed based operation and environmental condition of the engine. If the injection timing IT is changed, the rate of fuel passing through meshes of the mesh member (i.e., the mesh passing rate) changes. If the mesh passing rate changes, the set-off position (i.e., the ignition position of the air-fuel mixture) is extended or shortened. Based on this, under the condition of high ignition performance (i.e., the second condition), the mesh passing rate is controlled to increase thereby the set-off position is extended. On the other hand, under the condition of low ignition performance (i.e., the first condition), the mesh passing rate is controlled to decrease thereby the extension of the set-off position is suppressed or prohibited.

4 Claims, 10 Drawing Sheets

(56) References Cited

U.S. PATENT DOCUMENTS

| | | | | |
|---|---|---|---|---|
| 5,322,042 A | * | 6/1994 | di Priolo | F02B 19/14 |
| | | | | 123/193.6 |
| 2011/0083638 A1 | * | 4/2011 | Stovell | F02F 3/24 |
| | | | | 123/307 |
| 2016/0097360 A1 | | 4/2016 | Mueller | |
| 2019/0186402 A1 | * | 6/2019 | Sueoka | F02B 23/0645 |

FOREIGN PATENT DOCUMENTS

| | | | | |
|---|---|---|---|---|
| JP | 06093864 A | * | 4/1994 | ......... F02B 23/0669 |
| JP | H09-088609 A | | 3/1997 | |
| JP | 2014-020277 A | | 2/2014 | |
| JP | 2017-530298 A | | 10/2017 | |
| WO | 2016/054436 A1 | | 4/2016 | |

* cited by examiner

CONTROL SYSTEM FOR DIESEL ENGINE

CROSS-REFERENCE TO RELATED APPLICATION

The present disclosure claims priority under 35 U.S.C. § 119 to Japanese Patent Application No. 2018-113829, filed on Jun. 14, 2018. The content of which is incorporated herein by reference.

TECHNICAL FIELD

The present disclosure relates to a control system for diesel engine.

BACKGROUND

JPH6-17651A discloses a diesel engine in which a cavity is formed on a top surface of a piston. This conventional engine has a partition wall in a central part of the cavity. This partition wall separates the cavity concentrically. When the piston locates in the vicinity of TDC (Top Dead Center), the partition wall surrounds a tip of a nozzle part of a fuel injector.

The partition wall includes a mesh member. The mesh member is provided at a position facing the fuel spray injected from the tip. The fuel spray passes through the mesh member. During this passage, mixing of the fuel spray and surrounding air is promoted. Therefore, according to this conventional engine, it is possible to suppress occurrence of smoke to a low level.

However, in the conventional engine, the fuel spray passes through the mesh member irrespective of operating condition and environmental condition. Therefore, excessive mixing may induce misfire under a condition hardly causing ignition.

The present disclosure addresses the above described problem, and an object of the present disclosure is, to suppress the occurrence of smoke and misfire in the diesel engine equipped with the mesh member provided at the center portion of the cavity and through which the fuel spray passes.

SUMMARY

A first aspect of the present disclosure is a control system for diesel engine for solving the problem described above and has the following features.

The control system comprises a nozzle part, a piston, a mesh member, a rate change device, and a control device.

The nozzle part includes a fuel injection hole.

The piston includes a cavity which faces the nozzle part.

The mesh member is provided at a central portion of the cavity. The mesh member is configured to surround the nozzle part when the piston locates in the vicinity of TDC.

The rate change device is configured to change passing rate of injected fuel passing through meshes of the mesh member.

The control device is configured to control the rate change device.

The control device is further configured to control the rate change device such that the passing rate of the injected fuel under a first condition is lower than that under a second condition.

The ignition performance under the first condition is lower than that under the second condition.

A second aspect of the present disclosure has the following features according to the first aspect.

The rate change device is further configured to change injection timing of fuel.

The control device is further configured to control the rate change device such that the injection timing under the second condition is crank angle in the vicinity of TDC.

The control device is further configured to control the rate change device such that the injection timing under the first condition is advanced crank angle relative to that under the second condition.

A third aspect of the present disclosure has the following features according to the first aspect.

The mesh member includes an aperture formed at a position intersecting an axis of the injection hole when the piston locates in the vicinity of TDC.

The rate change device is further configured to change swirl ratio.

The control device is further configured to control the rate change device such that the swirl ratio is substantially zero under the first condition.

The control device is further configured to control the rate change device such that the swirl ratio under the second condition is higher than that under the first condition.

A fourth aspect of the present disclosure has the following features according to the first aspect.

The mesh member includes an aperture formed at a position intersecting an axis of the injection hole when the piston locates in the vicinity of TDC.

The rate change device is further configured to change fuel pressure in a delivery pipe which is configured to supply fuel to the nozzle part.

The control device is further configured to control the rate change device such that the fuel pressure under the first condition is lower than that under the second condition.

According to the first to fourth aspects, the passing rate under the first condition with relative low ignition performance is set lower than that under the second condition with relative high ignition performance. In other words, the passing rate under the second condition is set higher than that under the first condition. Therefore, under the second condition, it is possible to promote mixing of the fuel spray and air around it, thereby suppressing the occurrence of smoke. On the other hand, under the first condition, it is possible to suppress the occurrence of misfire due to excessive mixing of the fuel spray and air.

DESCRIPTION OF EMBODIMENT

Hereinafter, embodiments of the present disclosure will be described based on the accompanying drawings. Note that elements that are common to the respective drawings are denoted by the same reference characters and a duplicate description thereof is omitted. Further, the present disclosure is not limited to the embodiments described hereinafter.

First Embodiment

First, a first embodiment of the present disclosure will be described with reference to FIGS. 1 to 7.

1. System Configuration

Figure 1:
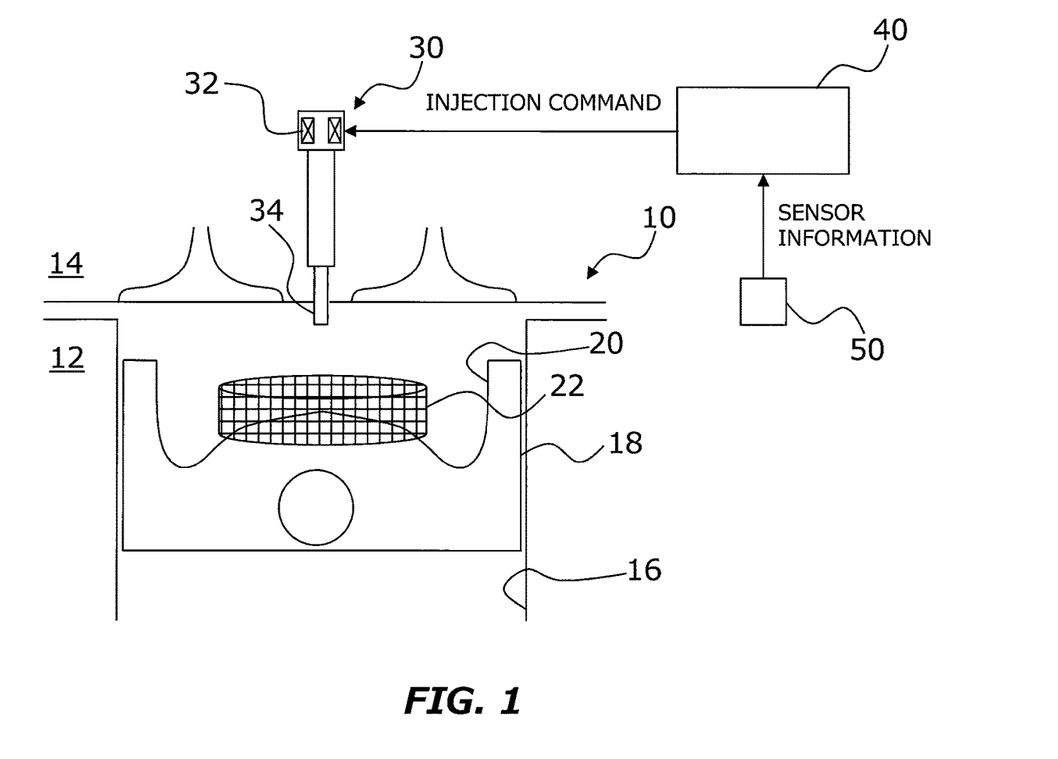
FIG. 1 is a diagram for illustrating a system configuration of a first embodiment of present disclosure.

FIG. 1 is a diagram for explaining a system configuration of the first embodiment. The system shown in FIG. 1 includes a diesel engine 10 (hereinafter also referred to as an "engine 10") installed in a vehicle. The number of cylinders and cylinder arrangement of the engine 10 are not particularly limited.

The engine 10 includes a cylinder block 12 and a cylinder head 14. In the cylinder block 12, a cylinder 16 is formed. In the cylinder 16, a piston 18 is accommodated. A cavity 20 is formed in a central portion of a top surface of the piston 18. A cylindrical mesh member 22 is provided on the central portion. The mesh member 22 is made of a material having heat resistance and durability such as stainless steel. The shape of the mesh member 22 shown in FIG. 1 is an example and the mesh member 22 may have a polygonal shape.

A fuel injector 30 is attached to the cylinder head 14. The fuel injector 30 is a normally close electromagnetic valve and includes a solenoid 32 and a nozzle part 34. The fuel injector 30 is opened in accordance with an energization command (an injection command) to the solenoid 32. At a tip of the nozzle part 34, a plurality of injection holes (e.g., eight injection holes) are radially formed. The fuel injector 30 is connected to a delivery pipe (not shown) to which high pressure fuel is supplied. Upon the opening of the fuel injector 30, each injection hole is opened and fuel from each injection hole diffuses in a spray state.

The system shown in FIG. 1 further includes an Electronic Control Unit (ECU) 40. The ECU 40 at least includes a Central Processing Unit (CPU), a Read Only Memory (ROM) and a Random Access Memory (RAM). The CPU executes various arithmetic processing based on control programs and maps stored in the ROM. The RAM temporarily stores calculation result in the CPU and information (i.e., sensor information) from a sensor group 50 mounted in the vehicle.

The sensor group 50 at least includes an air flow meter, an intake air temperature sensor, a crank angle sensor, an accelerator position sensor, a water temperature sensor, an atmospheric pressure sensor, an in-cylinder pressure sensor and a fuel pressure sensor. The air flow meter detects intake air amount $G_a$. The intake air temperature sensor detects intake air temperature $T_a$. The crank angle sensor detects engine speed NE. The accelerator position sensor detects accelerator position of an accelerator pedal which is operated by a driver of the vehicle. The water temperature sensor detects cooling water temperature $T_w$ of engine 10. The atmospheric pressure sensor detects atmospheric pressure CP. The in-cylinder pressure sensor detects pressure $P_a$ of gas in the cylinder 16 (i.e., in-cylinder pressure). The fuel pressure sensor detects fuel pressure $P_{cr}$ in the delivery pipe.

2. Fuel Injection Operation

Figure 2:
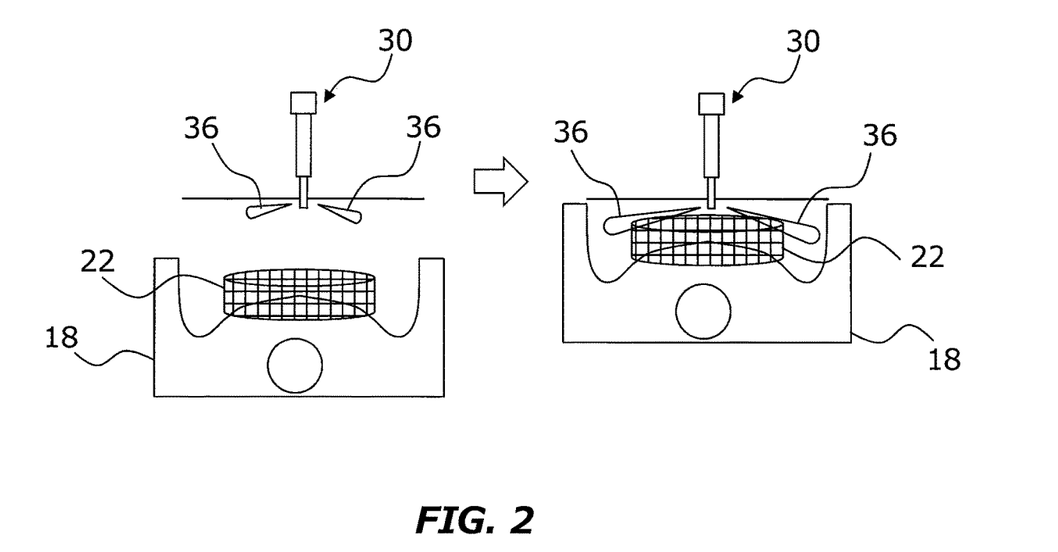
FIG. 2 is a diagram for explaining a fuel injection operation in the vicinity of TDC.

In first embodiment, a fuel injection operation is performed at least once per cycle. The fuel injection operation is normally performed in the vicinity of TDC. FIG. 2 is a diagram for explaining the fuel injection operation in the vicinity of TDC. In FIG. 2, the fuel injection operation in the vicinity of TDC is drawn in chronological order. As can be seen from FIG. 2, in the vicinity of TDC, since a distance from the piston 18 to the fuel injector 30 is short, part of a fuel spray 36 collides with the mesh member 22.

The mesh member 22 is selected so that size of individual meshes is larger than that of the individual microparticles constituting the fuel spray 36. For this reason, some particles collide with wire materials of the mesh member 22, while most of the particles pass through the meshes of the mesh member 22. However, when the microparticles pass through the meshes, turbulence occurs in the fuel spray 36. Then, the fuel spray 36 is able to take gas around it with ease. Also, when the microparticles pass through the meshes, the fuel spray 36 is cooled by the mesh member 22. Due to these factors, a set-off position (i.e., an ignition position of air-fuel mixture) is extended.

3. Features of Engine Control

In first embodiment, based on an operating condition and an environmental condition of the engine 10, engine control is executed in which fuel injection timing IT is changed. If the injection timing IT is changed, a rate of fuel passing through the meshes (hereinafter also referred to as a "mesh passing rate") changes. This mesh passing rate is defined as an amount of the fuel passing through the meshes to total amount of the fuel injected during one cycle. If the mesh passing rate changes, level of the turbulence and the cooling are also changed. If these levels are changed, then the set-off position is extended or shortened.

3.1 First Control Example

Figure 3:
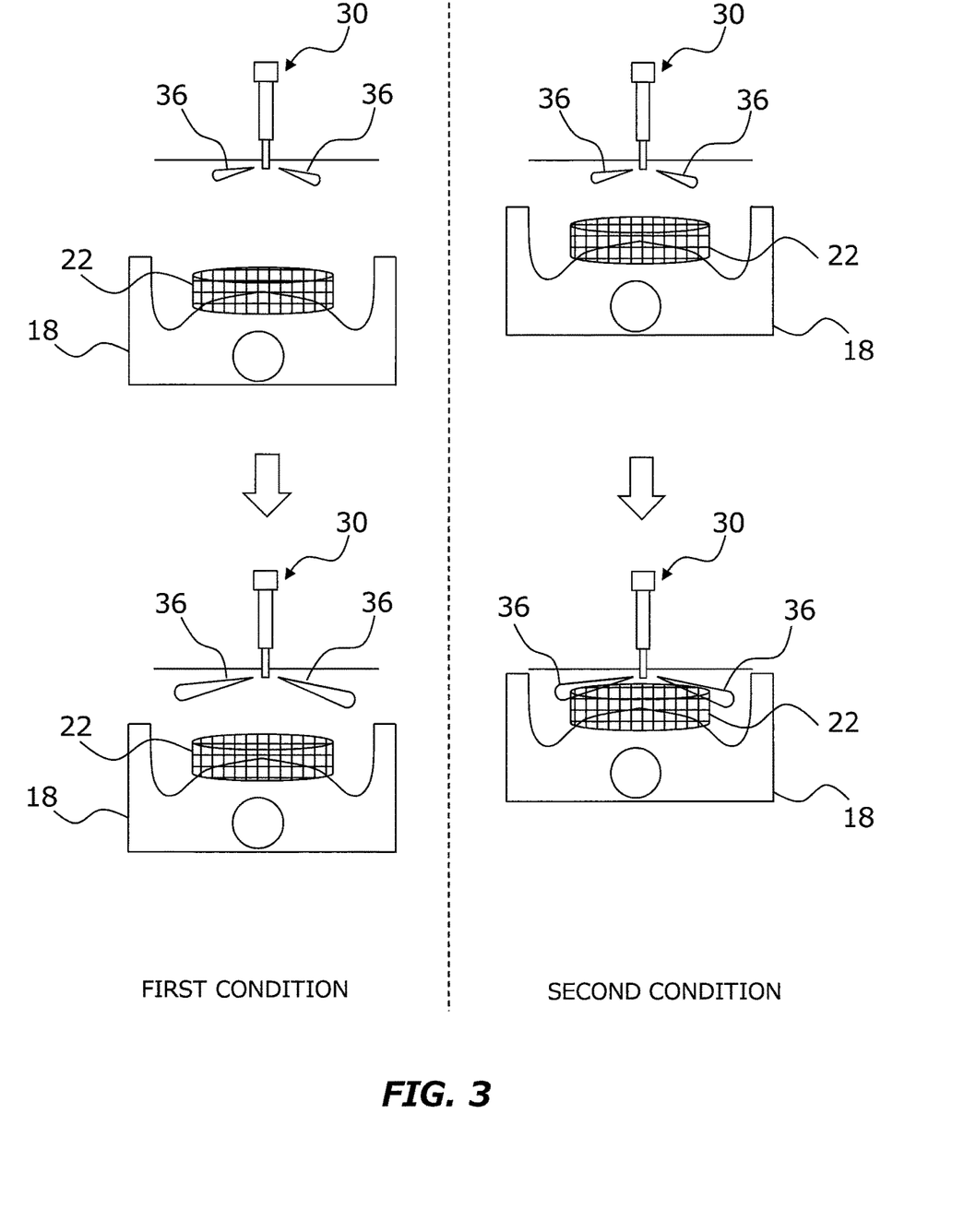
FIG. 3 is a diagram for illustrating a first engine control example of the first embodiment.

FIG. 3 is a diagram for explaining a first engine control example of the first embodiment. In the first control example, the injection timing $IT_{c1}$ under the first condition is set to crank angle at an advanced angle relative to the injection timing $IT_{c2}$ under the second condition. In FIG. 3, the upper schematic view corresponds to in-cylinder state immediately after the start of the fuel injection operation. The lower one corresponds to the in-cylinder state when the fuel injection operation has progressed to a certain extent.

The first and second conditions are distinguished by using ignition performance as an indicator. The first condition is defined as a condition hardly causing ignition. The first condition includes low load operation condition, idle operation condition and low water condition. The second condition is defined as a condition easily causing ignition. The second condition includes middle load operation condition and high load operation condition.

The injection timing $IT_{c2}$ is set to the crank angle in the vicinity of TDC. In other words, the injection timing $IT_{c2}$ is the same angle as the injection timing IT set in the normal fuel injection operation described in FIG. 2. Therefore, as shown in FIG. 3, under the second condition, part of the fuel spray 36 collides with the mesh member 22. As described above, if the part of the fuel spray 36 collides with the mesh member 22, the set-off position is extended. If the set-off position is extended, a local area consisting of fuel rich is reduced in the fuel spray 36. Therefore, under the second condition, occurrence of smoke is suppressed.

On the other hand, under the first condition, most of the fuel spray 36 does not collide with the mesh member 22. If most of the fuel spray 36 does not collide with the mesh member 22, the occurrence of the turbulence in the fuel spray 36 is suppressed. In addition, cooling of the fuel spray 36 by the mesh member 22 is suppressed. Therefore, under the first condition, decrease in the ignition performance is suppressed.

3.2 Second Control Example

Figure 4:
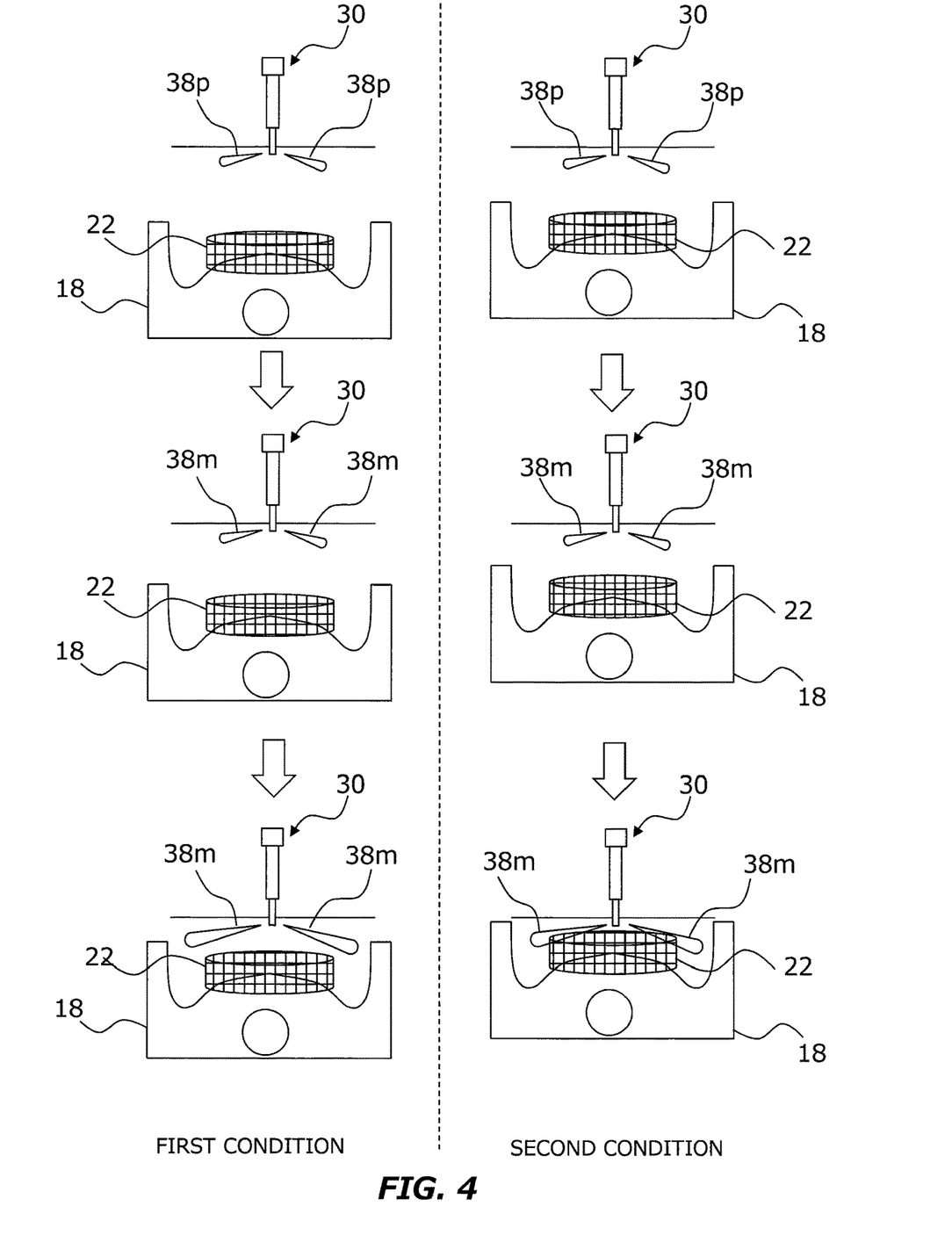
FIG. 4 is a diagram for illustrating a second engine control example of the first embodiment.

FIG. 4 is a diagram for explaining a second engine control example of the first embodiment. In the second control example, a main injection operation and a pilot injection operation are performed. The pilot injection operation is performed prior to the main injection operation. The pilot injection amount is set to a small amount (fixed amount). The main injection amount corresponds to remaining amount calculated by reducing the amount of the pilot injection operation from total injection amount during one cycle.

In the second control example, the main injection timing $IT_{mc1}$ under the first condition is set to crank angle at an advance angle relative to the main injection timing $IT_{mc2}$ under the second condition. In FIG. 4, the two schematic views at the upper stage correspond to the in-cylinder state during the pilot injection operation, respectively. The two schematic views at the middle stage correspond to the in-cylinder state immediately after the start of the main injection operation, respectively. The two schematic view at the lower stage correspond to the in-cylinder state when the main injection operation has progressed to a certain extent.

The first and the second conditions are common to the first control example described in FIG. 3.

The main injection timing $IT_{mc2}$ is set to the crank angle in the vicinity of TDC. In other words, the main injection timing $IT_{mc2}$ is the same timing as the injection timing IT in the normal fuel injection operation described in FIG. 2. Therefore, as shown in FIG. 4, under the second condition, part of the fuel spray 38m by the main injection operation collides with the mesh member 22. Therefore, similar to the first control example, the occurrence of smoke is suppressed under the second condition. Note that the fuel spray 38p by the pilot injection operation performed prior to the main injection operation does not collide with the mesh member 22.

On the other hand, under the first condition, most of the fuel spray 38m and the fuel spray 38p do not collide with the mesh member 22. Therefore, similar to the first control example, the decrease in the ignition performance is suppressed under the first condition.

4. Processing to Realize Engine Control of the First Embodiment

Processing examples to realize the engine control described above will be explained.

4.1 First Processing Example

Figure 5:
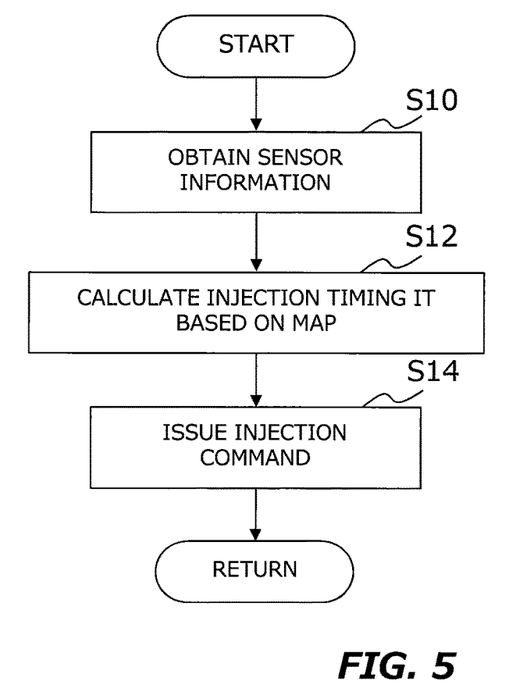
FIG. 5 is a flowchart for illustrating a first processing example which is executed as the engine control of the first embodiment.

FIG. 5 is a flowchart for illustrating a first processing example to realize the engine control of the first embodiment. The processing routine shown in FIG. 5 is repeatedly executed with a predetermined control cycle while the engine 10 is operated.

In the processing routine shown in FIG. 5, first, the sensor information is acquired (step S10). The acquired sensor information corresponds to necessary information for identifying the operating and environmental conditions of the engine 10 among various information detected by the sensor group 50. The necessary operating condition is specified based on, for example, engine speed NE, fuel pressure $P_{cr}$, fuel injection amount $Q_v$ and the like. The fuel injection amount $Q_v$ is calculated based on intake air amount $G_a$ and the like. The necessary environmental condition is specified based on, for example, outside air temperature (intake air temperature $T_a$), cooling water temperature $T_w$, atmospheric pressure CP, and the like.

Subsequent to the step S10, the injection timing IT is calculated (step S12). The injection timing IT is calculated by referring to a map in which a relationship between the necessary operating and environmental conditions and the injection timing IT is defined. In other words, in the first processing example, the injection timing IT is calculated based on the map.

Subsequent to the step S12, the injection command is issued (step S14). The injection command is output to the solenoid 32. As a result, the solenoid 32 is operated at the injection timing IT which was calculated in the step S12.

4.2 Second Processing Example

Figure 6:
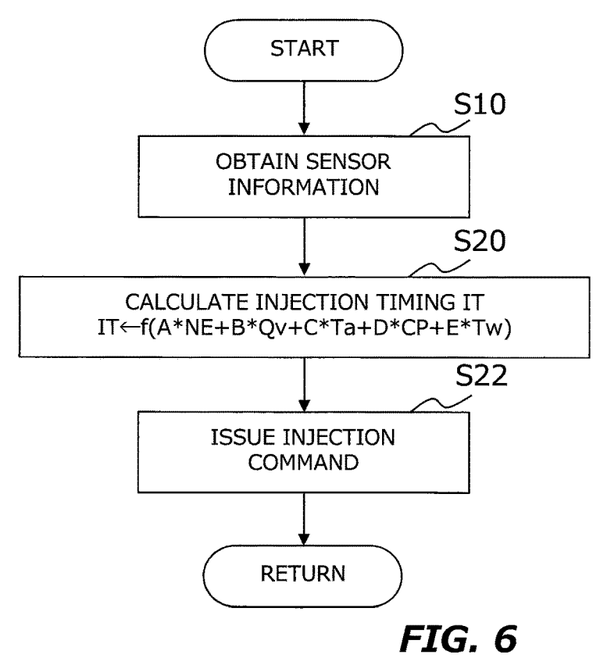
FIG. 6 is a flowchart for illustrating a second processing example which is executed as the engine control of the first embodiment.

FIG. 6 is a flowchart for illustrating a second processing example to realize the engine control of the first embodiment. The processing routine shown in FIG. 6 is repeatedly executed with the predetermined control cycle while the engine 10 is operated.

In the processing routine shown in FIG. 6, after acquiring the sensor information in the step S10, the injection timing IT is calculated (step S20). The injection timing IT is calculated based on the following formula (1) expressing a relationship between the necessary operating and environmental conditions and the injection timing IT.

$$IT = f(A \cdot NE + B \cdot Q_v + C \cdot T_a + D \cdot CP + E \cdot T_w) \tag{1}$$

In other words, in the second processing example, the injection timing IT is calculated based on a model formula expressing the relationship mentioned above. Note that A, B, C, D and E in the formula (1) are coefficients. When both the main and pilot injection operations are performed, two model formulas similar to the formula (1) are separately prepared.

Subsequent to the step S20, the injection command is issued (step S22). The injection command is output to the solenoid 32. As a result, the solenoid 32 is operated at the injection timing IT calculated in the step S20.

4.3 Third Processing Example

Figure 7:
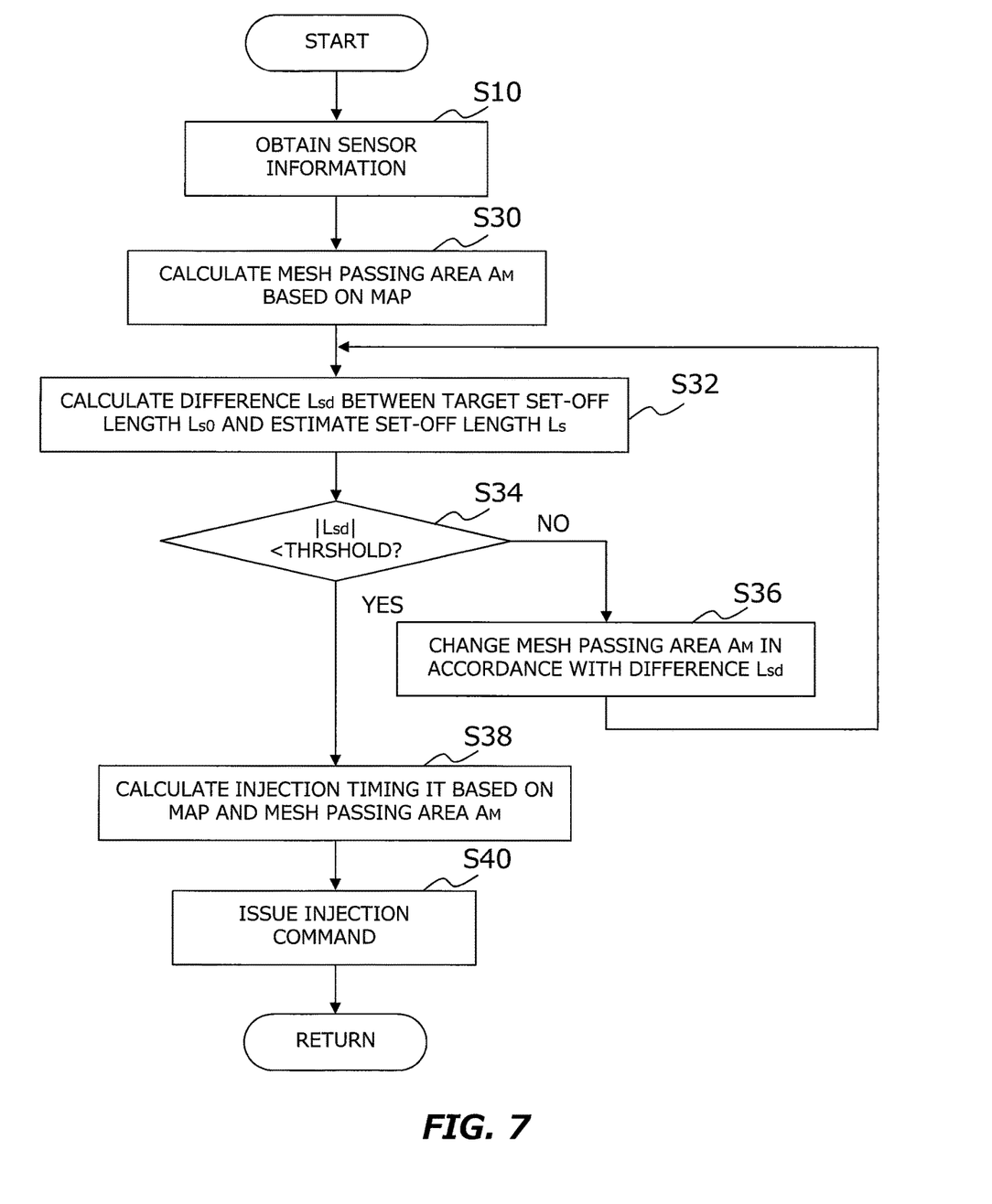
FIG. 7 is a flowchart for illustrating a third processing example which is executed as the engine control of the first embodiment.

FIG. 7 is a flowchart for illustrating a third processing example to realize the engine control of the first embodiment. The processing routine shown in FIG. 7 is repeatedly executed with the predetermined control cycle while the engine 10 is operated.

In the processing routine shown in FIG. 7, a mesh passing area $A_M$ is calculated in step S30 after the sensor information is acquired in the step S10. The mesh passing area $A_M$ is calculated by referring to a map in which a relationship between a period of the fuel injection operation and the mesh passing area $A_M$ is defined.

Figure 8:
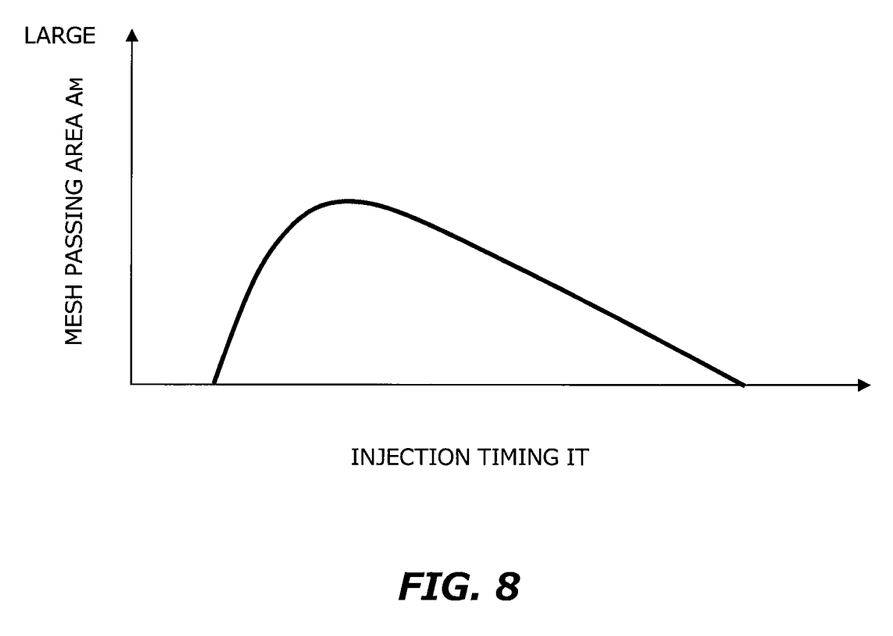
FIG. 8 is a diagram for showing an example of a relationship between a period of the fuel injection operation and a mesh passing area.

FIG. 8 is a diagram for showing an example of the relationship between the period of fuel injection operation and the mesh passing area $A_M$. This relationship is defined for each fuel pressure $P_{cr}$. The period of the fuel injection operation is calculated based on an injection timing ITt which is set provisionally. The injection timing ITt is calculated, for example, by referring to the map used in step S12 of FIG. 5.

Subsequent to the step S30, a difference $L_{sd}$ between a target set-off length $L_{s0}$ and an estimate set-off length $L_s$ is calculated (step S32). The "set-off length" is a distance from the position of the ignition hole to the set-off position. The "target set-off length $L_{s0}$" is a target value of the set-off length. The target set-off length $L_{s0}$ is calculated based on the sensor information acquired in the step S10.

The "estimate set-off length $L_s$" is an estimate value of the set-off length. The estimate set-off length $L_s$ is calculated based on the following formula (2).

$$L_s = \frac{\alpha \cdot v_{sp} \cdot \gamma \cdot A_M}{\beta \cdot T_{sp}} = \frac{\alpha \cdot \sqrt{(P_{sp} - P_a)}}{P_a} \cdot \frac{\gamma \cdot A_M}{\beta \cdot T_{sp}} \quad (2)$$

In the formula (2), $v_{sp}$ is a flow velocity of fuel spray, $T_{sp}$ is a temperature of the fuel spray, $P_{sp}$ is an injection pressure (that is, a fuel pressure $P_{cr}$), $P_a$ is an atmospheric pressure, and $\alpha$, $\beta$ and $\gamma$ are coefficients.

The flow velocity of the fuel spray $v_{sp}$ in the formula (2) is calculated based on the following formula (3) which is obtained by transforming Orifice Equation.

$$v_{sp} = \frac{Q_v}{A} = C_d \sqrt{\frac{(P_{sp} - P_a)}{\rho_f}} \quad (3)$$

In the formula (3), $C_d$ is a nozzle flow coefficient and $\rho_f$ is fuel density.

The temperature of the fuel spray $T_{sp}$ in the formula (2) is calculated based on the following formula (4) considering gas around the fuel spray 36 which is carried by the fuel spray 36 (i.e., entrainment gas).

$$T_{sp} = \frac{M_f \cdot C_f \cdot T_f + M_a \cdot C_a \cdot T_a}{M_{sp} \cdot C_{sp}} \quad (4)$$

In the formula (4), $M_f$ is fuel mass, $C_f$ is specific heat of fuel and $T_f$ is fuel temperature. $M_a$ is mass of the entrainment gas, $C_a$ is specific heat of the entrainment gas and $T_a$ is temperature of the entrainment gas.

The mesh passing area $A_M$ in the formula (2) is obtained based on the following formula (5) proposed by Hiroyasu et al. in which a travel distance of a fuel spray $L_{SP}$ is represented and the following formula (6) proposed by Zama et al in which fuel spray angle is represented.

$$L_{sp} = \begin{cases} 0.39 \sqrt{\frac{2(P_{sp} - P_a)}{\rho_f}} t & t < \text{breakup time} (I) \\ 2.95 \left(\frac{(P_{sp} - P_a)}{\rho_f}\right)^{0.25} \cdot \sqrt{d_0 \cdot t} & t \geq \text{breakup time} (II) \end{cases}$$

In the formula (5), $\rho_a$ is atmosphere density.

$$\theta = 0.017 \left(\frac{d_n^2 \cdot \rho_a \cdot (P_{sp} - P_a)}{\mu_a^2}\right)^{0.25} \quad (6)$$

In the formula (6), $\mu_a$ is atmospheric viscosity.

Subsequent to the step S32, it is determined whether an absolute value $|L_{sd}|$ of the difference $L_{sd}$ calculated in the step S32 is smaller than a threshold value (step S34). If it is determined that the absolute value $|L_{sd}|$ is greater than or equal to the threshold value, the mesh passing area $A_M$ is changed according to the difference $L_{sd}$ (step S36). The change of mesh passing area $A_M$ is determined according to a magnitude relationship between the target set-off length $L_{s0}$ and the estimate set-off length $L_s$. Specifically, if $L_{s0} > L_s$, the mesh passing area $A_M$ is increased. If $L_{s0} < L_s$, the mesh passing area $A_M$ is decreased.

The processing from the steps S32 to S36 is continuously executed until it is determined in the step S34 that the absolute value $|L_{sd}|$ is smaller than the threshold value.

If it is determined in the step S34 that the absolute value $|L_{sd}|$ is smaller than the threshold value, the injection timing IT is calculated (step S38). The calculation of the injection timing IT is executed based on the mesh passing area $A_M$ used in the processing of the step S32 immediately before that of the step S38 (i.e., the mesh passing area $A_{M32}$). Specifically, the mesh passing area $A_{M32}$ is used while referring to the map in which the relationship shown in FIG. 8 is represented. By referring to this map, the period of the fuel injection operation is calculated. Then, the injection timing IT is calculated based on the calculated period.

Subsequent to the step S38, the injection command is issued (step S40). The injection command is output to the solenoid 32. As a result, the solenoid 32 is operated at the injection timing IT which was calculated in the step S38.

5. Advantageous Effect

According to the engine control of the first embodiment, it is possible to extend the set-off position under a condition of high ignition performance (i.e., the second condition). Also, under a condition of low ignition performance (i.e., the first condition) it is possible to suppress to extend the set-off position too much, or prohibit the extension itself. Therefore, it is possible to suppress the occurrence of smoke while securing of the ignition performance.

6. Correspondence Between First Embodiment and Aspects

In the first embodiment, the solenoid 32 corresponds to the "rate change device" of the first aspect. The ECU 40 corresponds to the "control device" of the first aspect.

Second Embodiment

Next, a second embodiment of the present disclosure will be described with reference to FIGS. 9 to 12. In the following, different description between the first and second embodiments will be mainly described, and common description will be omitted as appropriate.

1. System Configuration

Figure 9:
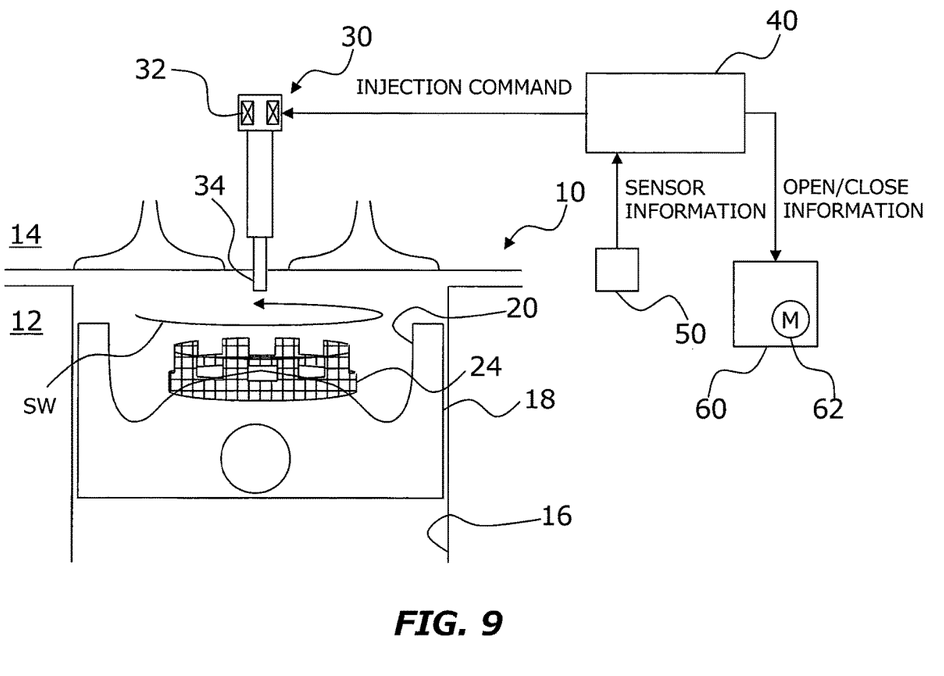
FIG. 9 is a diagram for illustrating a configuration of a system according to a second embodiment of the present disclosure.

FIG. 9 is a diagram for explaining a configuration of a system according to the second embodiment. The system shown in FIG. 9 includes a cylindrical mesh member 24 in the central portion of the cavity 20. Like the mesh member 22 shown in FIG. 1, the mesh member 24 is made of the material having heat resistance and durability such as stainless steel. However, unlike the mesh member 22, a plurality of apertures 26 are formed in an upper portion of the mesh member 24. It is to be noted that the apertures 26 may be formed from top to bottom of the mesh member 24. In this case, the mesh member 24 is composed of a plurality of bending members.

Figure 10:
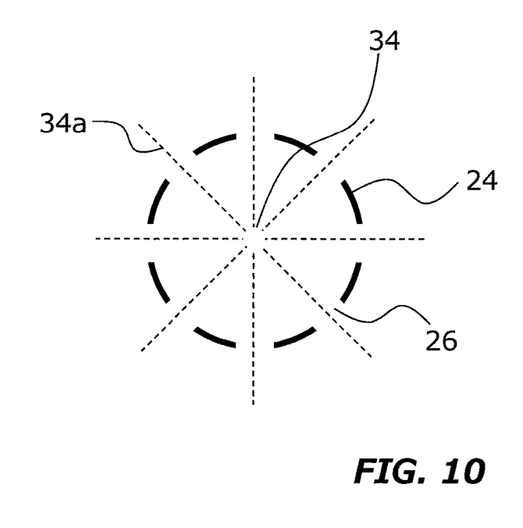
FIG. 10 is a view for explaining an aperture of a mesh member.

FIG. 10 is a view for explaining the apertures 26. As shown in FIG. 10, the apertures 26 are formed at equal intervals around a wall of the mesh member 24. The number of the apertures 26 is eight in FIG. 10, and this number is equal to that of the injection holes. The apertures 26 are formed at each position where each axis of injection holes 34a and the mesh member 24 intersects.

Returning to FIG. 9, the system configuration will be described. The system shown in FIG. 9 includes a SCV (Swirl Control Valve) 60. The SCV 60 is provided in one of two intake ports (not shown) communicating with the cylinder 16. The SCV 60 is an electromagnetic valve and is equipped with a DC motor 62. In response to a drive command (e.g., an open/close command) to the DC motor 62, the SCV 60 opens and closes the intake port with which the SCV 60 is provided (hereinafter also referred to as a "swirl port"). When the swirl port is closed by the SCV 60, swirl flow SW is generated in the cylinder 16. The swirl flow SW may be generated by driving a variable valve mechanism (not shown). In this case, the swirl flow SW is generated by setting a difference between lift amounts of two intake air valves by using the variable valve mechanism.

2. Features of Engine Control

In the engine control of the first embodiment, the injection timing IT of the fuel was changed based on the operating and environmental conditions of the engine 10. On the other hand, in the engine control according to the second embodiment, the injection timing IT is not changed (i.e., the injection timing IT is fixed in the vicinity of TDC). Instead, closing degree CD of the swirl port is changed. If the closing degree CD is changed, swirl ratio SR changes. The swirl ratio SR is defined as a ratio of the engine speed NE to rotational speed of the swirl flow SW. If the swirl ratio SR changes, the mesh passing rate changes. If the mesh passing rate changes, the level of the turbulence and the cooling described above are also changed. If these level are changed, the set-off position is extended or shortened.

2.1 Control Example

In the engine control of the second embodiment, the closing degree $CD_{c1}$ under the first condition is controlled to substantially zero. In other words, the swirl port is fully opened, and the swirl ratio SR is substantive zero. The substantive zero includes zero and a value close to zero. Also, in the engine control of the second embodiment, the closing degree $CD_{c2}$ under the second condition is controlled to a value larger than the closing degree $CD_{c1}$. In other words, under the second condition, an opening area of the swirl port becomes small and the swirl ratio SR becomes a high value. It is noted that the closing degree $CD_{c2}$ may be subdivided into two or more opening degrees based on the operating and environmental conditions.

Figure 11:
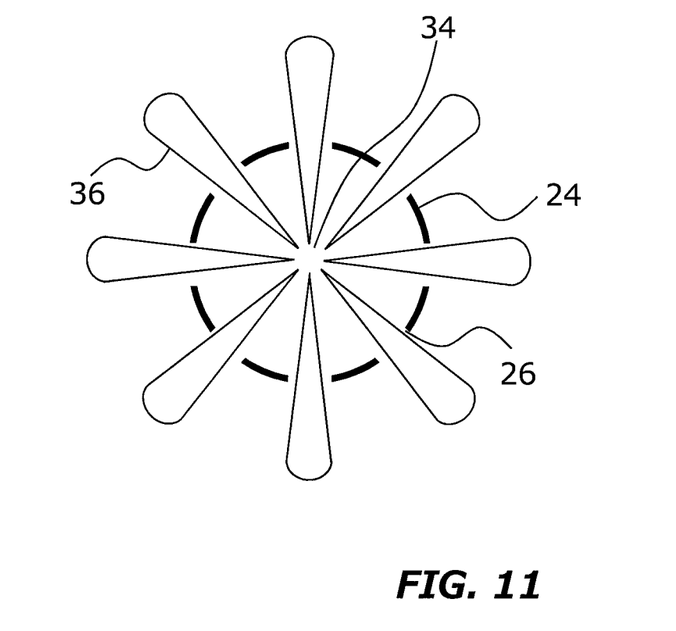
FIG. 11 is a diagram for showing diffusion state of fuel spray under a first condition.
Figure 12:
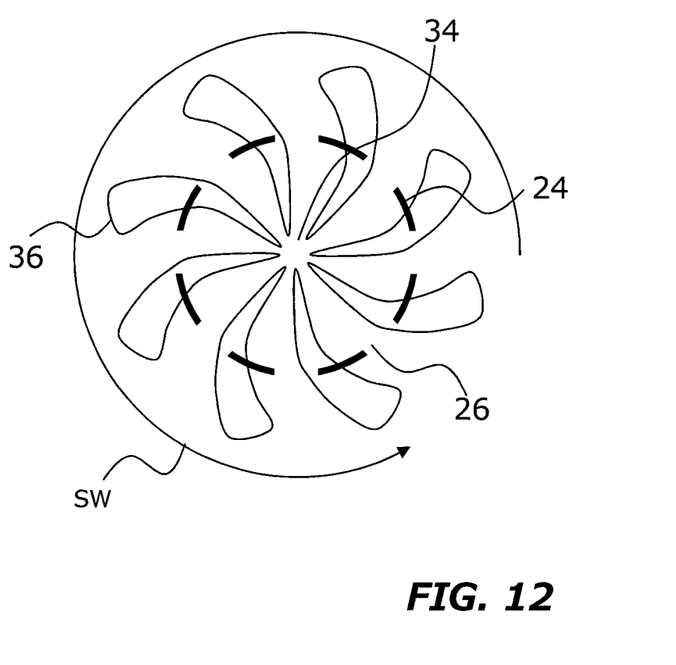
FIG. 12 is a diagram for showing the diffusion state of the fuel spray under a second condition.

FIG. 11 is a diagram for showing diffusion state of the fuel spray 36 under the first condition. FIG. 12 is a diagram for showing the diffusion state of the fuel spray 36 under the second condition. As shown in FIG. 11, most of the fuel spray 36 pass through the aperture 26 under the first condition. In other words, most of the fuel spray 36 does not collide with the mesh member 24. On the other hand, as shown in FIG. 12, under the second condition, the fuel spray 36 is flown in a direction of the swirl flow SW, and part of the fuel spray 36 collides with the mesh member 24.

2.2 Processing Example

Regarding processing example to realize the engine control described above, "the injection timing IT" in the description with reference to FIGS. 5 to 7 may be appropriately replaced with "the closing degree CD".

3. Advantageous Effect

According to the engine control of the second embodiment described above, an advantageous effect equivalent to the effect obtained by that in the first embodiment is obtained.

4. Correspondence Between Second Embodiment and Aspects

In the second embodiment, the DC motor 62 corresponds to the "rate change device" of the first aspect. The ECU 40 corresponds to the "control device" of the first aspect.

Third Embodiment

Next, a third embodiment of the present disclosure will be described with reference to FIGS. 13 to 16. In the following, different description between the preceding and the third embodiments will be mainly described, and common description will be omitted as appropriate.

1. System Configuration

Figure 13:
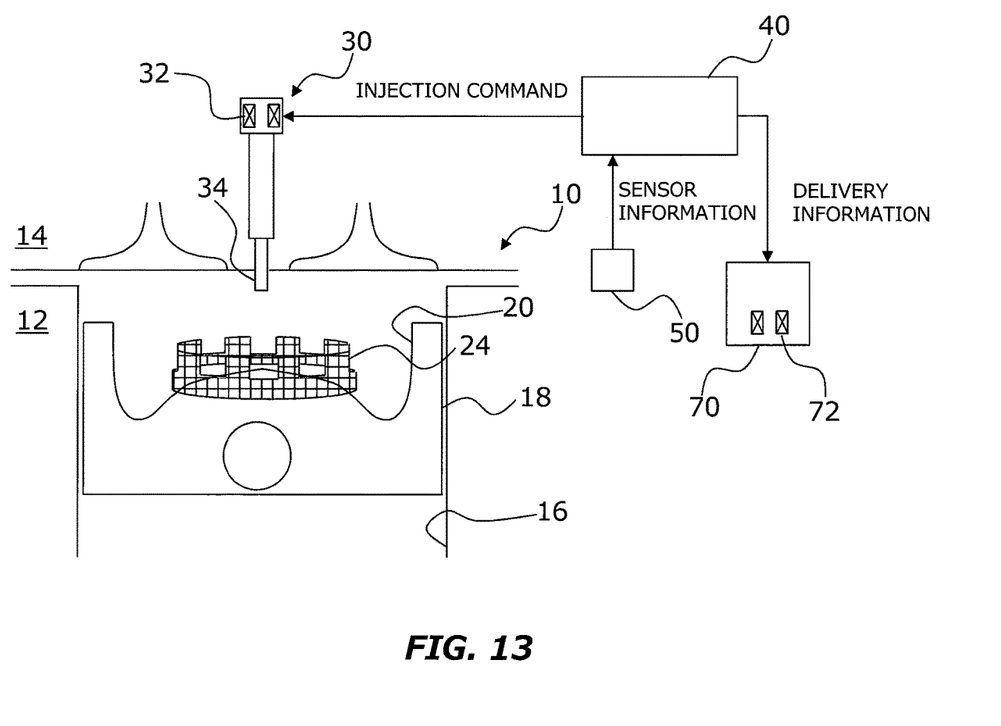
FIG. 13 is a diagram for illustrating a configuration of a system according to a third embodiment of present disclosure.

FIG. 13 is a diagram for explaining a configuration of a system according to third embodiment. The system shown in FIG. 13 includes the mesh member 24 as in the system shown in FIG. 9. As already explained, the mesh member 24 has the apertures 26.

The system shown in FIG. 13 is equipped with a high-pressure fuel pump 70. The fuel pump 70 is connected to the delivery pipe described above. The fuel pump 70 is driven by rotation of a crankshaft (not shown) of the engine 10 to compress the fuel in a compression chamber (not shown) and deliver it to the delivery pipe. The fuel pump 70 has a spill valve (not shown) at a suction port of the compression chamber. The spill valve is a normally open electromagnetic valve, which is closed based on an energization command (a delivery command) to the solenoid 72. The configuration of the fuel pump equipped with the compression chamber and the spill valve is known per se, so further explanation will be omitted.

2. Features of Engine Control

In the engine control of the first embodiment, the injection timing IT was changed based on the operating and environmental conditions. In the engine control of the second embodiment, the closing degree CD was changed instead of the injection timing IT. In these engine controls, the mesh passing rate was changed thereby the set-off position was changed. On the other hand, in the engine control of the third embodiment, the fuel pressure $P_{cr}$ is changed. When the fuel pressure $P_{cr}$ is changed, volume of the fuel spray 36 changes. If the volume of the fuel spray 36 changes, the mesh passing rate changes. If the mesh passing rate changes, the disturbance and the degree of cooling change as described above. If these degrees change, the set-off position is extended or shortened.

2.1 Control Example

Figure 14:
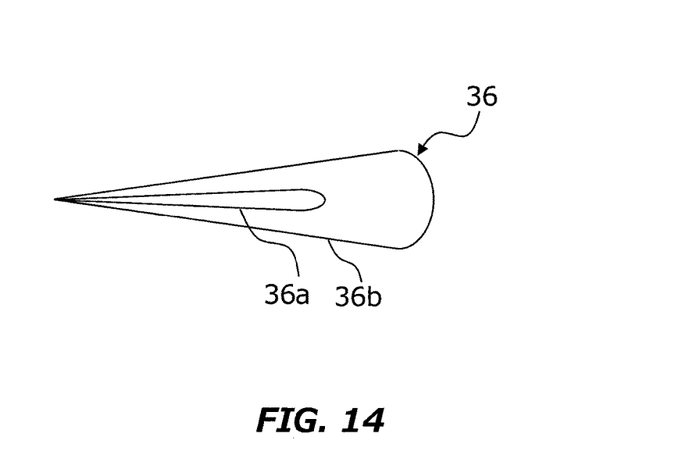
FIG. 14 is an enlarged schematic view of the fuel spray in the third embodiment.

In the engine control of the third embodiment, the fuel pressure $P_{crc2}$ under the second condition is controlled to a higher value than the fuel pressure $P_{crc1}$ under the first condition. FIG. 14 is an enlarged schematic view of the fuel spray 36. As shown in FIG. 14, the fuel spray 36 is composed of a liquid phase portion 36a and a gas phase portion 36b. The gas phase portion 36b is formed by the diffusion of the microparticles constituting the liquid phase portion 36a around the liquid phase portion 36a locating at a central region of the fuel spray 36. The higher the fuel pressure $P_{cr}$, the larger the volume of the liquid phase portion 36a. If the volume of the liquid phase portion 36a expands, the volume of the gas phase portion 36b also expands. Therefore, the volume of the fuel spray 36 expands. The fuel pressure $P_{crc2}$ may be subdivided into two or more types of fuel pressures based on the operating and environmental conditions.

Figure 15:
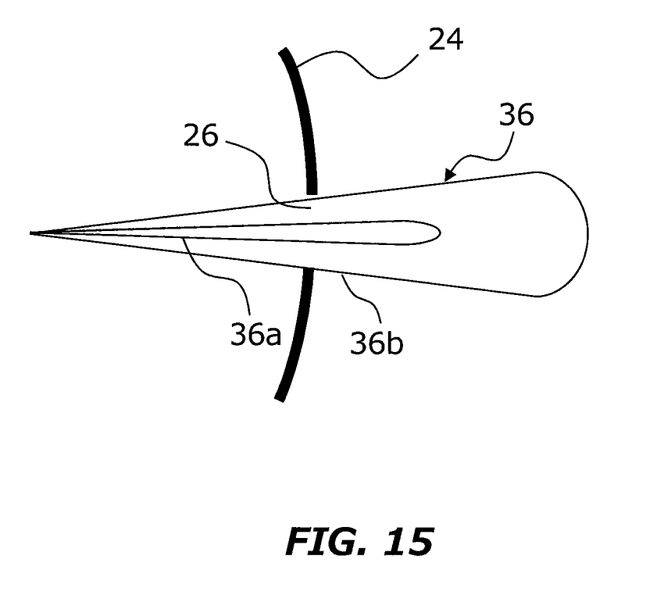
FIG. 15 is a diagram for showing the diffusion state of the fuel spray under the first condition.
Figure 16:
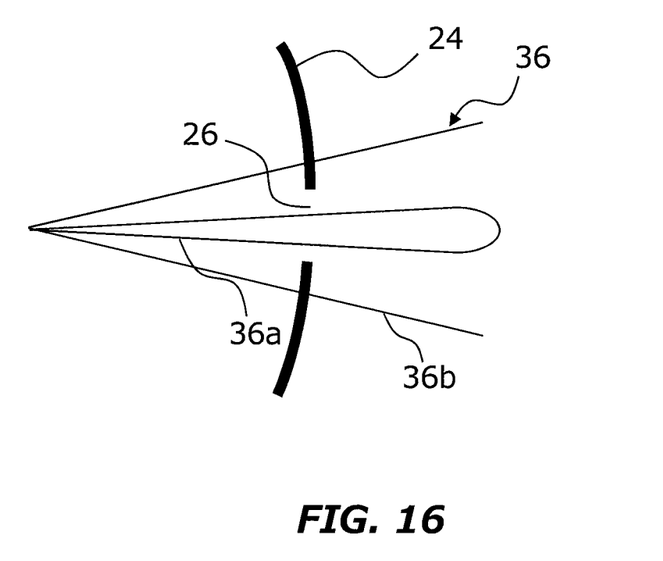
FIG. 16 is a diagram for showing the diffusion state of the fuel spray under the second condition.

FIG. 15 is a diagram for showing the diffusion state of the fuel spray 36 under the first condition. FIG. 16 is a diagram showing the diffusion state of the fuel spray 36 under the second condition. As shown in FIG. 15, under the first condition, most of the fuel spray 36 pass through the apertures 26. In other words, most of the fuel spray 36 does not collide with the mesh member 24. On the other hand, as shown in FIG. 16, under the second condition, part of the gas phase portion 36b collides with the mesh member 24.

2.2 Processing Example

Regarding processing example to realize the engine control described above, "the injection timing IT" in the description with reference to FIGS. 5 to 7 may be appropriately replaced with "the fuel pressure $P_{cr}$".

3. Advantageous Effect

According to the engine control of the third embodiment described above, an advantageous effect equivalent to the effect obtained by that in the first embodiment is obtained.

4. Correspondence Between Third Embodiment and Aspects

In the third embodiment, the solenoid 72 corresponds to the "rate change device" of the first aspect. The ECU 40 corresponds to "control device" of the first aspect.

What is claimed is:

1. A control system for diesel engine comprising:
a nozzle part which includes a fuel injection hole formed;
a piston which includes a cavity facing the nozzle part, the cavity being formed in a central portion at a top surface of the piston;
a continuously cylindrical mesh member which is provided in the cavity on the central portion at the top surface of the piston and is configured to surround the nozzle part in a crank angle where the piston raises up to a position of the nozzle part;
a rate change device which is configured to change passing rate of injected fuel passing through meshes of the mesh member; and
a control device which is configured to control the rate change device,
wherein the control device is further configured to control the rate change device such that the passing rate of the injected fuel under a first condition is lower than that under a second condition,
wherein the ignition performance under the first condition is lower than that under the second condition.

2. The control system according to claim 1,
wherein the rate change device is further configured to change injection timing of fuel,
wherein the control device is further configured to:
control the rate change device such that the injection timing under the second condition is the crank angle where the piston raises up to the position of the nozzle part; and
control the rate change device such that the injection timing under the first condition is advanced crank angle relative to that under the second condition.

3. The control system according to claim 1,
wherein the mesh member includes an aperture formed at a position intersecting an axis of the injection hole in the crank angle where the piston raises up to the position of the nozzle part,
wherein the rate change device is further configured to change swirl ratio,
wherein the control device is further configured to:
control the rate change device such that the swirl ratio is substantially zero under the first condition; and
control the rate change device such that the swirl ratio under the second condition is higher than that under the first condition.

4. The control system according to claim 1,
wherein the mesh member includes an aperture formed at a position intersecting an axis of the injection hole in the crank angle where the piston raises up to the position of the nozzle part,
wherein the rate change device is further configured to change fuel pressure in a delivery pipe which is configured to supply fuel to the nozzle part,
wherein the control device is further configured to control the rate change device such that the fuel pressure under the first condition is lower than that under the second condition.

* * * * *